(12) United States Patent
Sasaki

(10) Patent No.: US 9,546,681 B2
(45) Date of Patent: Jan. 17, 2017

(54) CROWN SHAPED RETAINER

(71) Applicant: Katsuaki Sasaki, Shizuoka (JP)

(72) Inventor: Katsuaki Sasaki, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/442,836

(22) PCT Filed: Oct. 16, 2013

(86) PCT No.: PCT/JP2013/078087
§ 371 (c)(1),
(2) Date: May 14, 2015

(87) PCT Pub. No.: WO2014/077077
PCT Pub. Date: May 22, 2014

(65) Prior Publication Data
US 2015/0330447 A1 Nov. 19, 2015

(30) Foreign Application Priority Data

Nov. 16, 2012 (JP) .................................. 2012-252355

(51) Int. Cl.
*F16C 33/41* (2006.01)
*F16C 33/44* (2006.01)
(Continued)

(52) U.S. Cl.
CPC ........... *F16C 33/414* (2013.01); *F16C 33/418* (2013.01); *F16C 43/08* (2013.01); *F16C 19/06* (2013.01);
(Continued)

(58) Field of Classification Search
CPC ......... F16C 19/06; F16C 33/44; F16C 33/414; F16C 33/416; F16C 33/418; F16C 2204/20; F16C 2208/36; F16C 2204/26; F16C 2240/44; F16C 2220/02
(Continued)

(56) References Cited

U.S. PATENT DOCUMENTS 1,783,957 A * 12/1930 Darby .................... F16C 33/56
                                                       384/577
4,493,513 A *  1/1985 Osawa ................ F16C 33/3887
                                                       384/523
(Continued)

FOREIGN PATENT DOCUMENTS

DE      2814629 A1 * 10/1979 ............... H02K 7/06
JP      54-156042       10/1979
(Continued)

OTHER PUBLICATIONS

International Search Report issued Jan. 21, 2014 in International (PCT) Application No. PCT/JP2013/078087.
(Continued)

*Primary Examiner* — Marcus Charles
(74) *Attorney, Agent, or Firm* — Wenderoth, Lind & Ponack, L.L.P.

(57) ABSTRACT

Provided is a crown-shaped retainer (20), including: an annular base (22); a plurality of pockets (24) each penetrating the crown-shaped retainer in a radial direction thereof and having an opening (a) on one side of the crown-shaped retainer in an axial direction thereof; and a pair of prongs (26) positioned on both sides of the opening (a) of each of the plurality of pockets (24) in a circumferential direction of the crown-shaped retainer, the each of the plurality of pockets (24) having an inner circumferential surface including: a spherical portion (28) positioned on a radially inner side of the crown-shaped retainer; and a cylindrical portion (30) positioned on a radially outer side of the crown-shaped
(Continued)

retainer, the cylindrical portion (30) having an inner diameter ($\phi$ D2) larger than a ball diameter (dw).

13 Claims, 4 Drawing Sheets

(51) Int. Cl.
*F16C 33/38* (2006.01)
*F16C 43/08* (2006.01)
*F16C 19/06* (2006.01)

(52) U.S. Cl.
CPC ............. *F16C 33/416* (2013.01); *F16C 33/44* (2013.01); *F16C 2204/20* (2013.01); *F16C 2204/26* (2013.01); *F16C 2204/50* (2013.01); *F16C 2208/36* (2013.01); *F16C 2240/44* (2013.01)

(58) Field of Classification Search
USPC ............... 384/470, 490, 523, 527, 531–533, 560,384/534, 537; 29/898.067
See application file for complete search history.

(56) References Cited

U.S. PATENT DOCUMENTS

| | | | | |
|---|---|---|---|---|
| 5,015,105 A | * | 5/1991 | Ueno | F16C 33/416 384/526 |
| 5,558,448 A | * | 9/1996 | Yabe | F16C 33/416 29/898.067 |
| 6,200,038 B1 | * | 3/2001 | Fierling | F16C 33/416 384/531 |
| 6,368,245 B1 | * | 4/2002 | Goto | F16C 19/10 384/606 |
| 6,371,655 B1 | * | 4/2002 | Fierling | F16C 33/416 384/470 |
| 8,157,449 B2 | * | 4/2012 | Doyer | F16C 33/416 384/470 |
| 2002/0054721 A1 | * | 5/2002 | Yoshida | F16C 19/163 384/523 |
| 2005/0069239 A1 | * | 3/2005 | Yamamoto | F16C 19/28 384/572 |
| 2011/0002568 A1 | * | 1/2011 | Kawamura | F16C 33/416 384/470 |
| 2011/0142388 A1 | * | 6/2011 | Maejima | F16C 33/416 384/523 |
| 2012/0039558 A1 | * | 2/2012 | Shimazu | B22C 9/28 384/572 |
| 2012/0183248 A1 | | 7/2012 | Fujiwara et al. | |

FOREIGN PATENT DOCUMENTS

| | | | | |
|---|---|---|---|---|
| JP | 2003-314561 | | 11/2003 | |
| JP | 2004060701 A | * | 2/2004 | |
| JP | 2005-133893 | | 5/2005 | |
| JP | 2007333187 A | * | 12/2007 | |
| JP | 2008175239 A | * | 7/2008 | |
| JP | 2008-190663 | | 8/2008 | |
| JP | 2009001611 A | * | 1/2009 | ........ C10M 169/00 |
| JP | 2009197873 A | * | 9/2009 | |
| JP | 2011032356 A | * | 2/2011 | |
| JP | 2011-74962 | | 4/2011 | |
| SU | 1612139 A1 | * | 12/1990 | |

OTHER PUBLICATIONS

International Preliminary Report on Patentability and Written Opinion of the International Searching Authority issued May 19, 2015 in International(PCT) Application No. PCT/JP2013/078087.

* cited by examiner

FIG. 5

| | PEEK | MAGNESIUM DIE CASTING MDC1A,MDC1B | ALUMINUM DIE CASTING ADC10,ADC12 | ZINC DIE CASTING ZDC1,ZDC2 |
|---|---|---|---|---|
| SPECIFIC GRAVITY/DENSITY | 1.52 | 1.8 | 2.68 | 6.7 |
| TENSILE STRENGTH MPa | 173 | 230 | 310 | 324 |
| ELONGATION % | 4 | 3 | 3.5 | 3.5 |
| COEFFICIENT OF LINEAR EXPANSION $\times 10^{-5} K^{-1}$ | 2.3 | 2.74 | 2.1 | 2.7 |

CROWN SHAPED RETAINER

CROSS REFERENCE TO RELATED APPLICATIONS

The present application is a U.S. national stage application of International (PCT) Application No. PCT/JP2013/078087 filed on Oct. 16, 2013, and claims foreign priority to Japanese Application No. 2012-252355 filed on Nov. 16, 2012, the contents of which are incorporated by reference.

TECHNICAL FIELD

The present invention relates to an improvement of a crown-shaped retainer to be used for a ball bearing.

BACKGROUND ART

According to the terminology of rolling bearings in conformity with JIS 0104-1991, a crown-shaped retainer is defined as a retainer having prongs shaped so that rolling elements and the retainer maybe assembled together through elastic deformation. The name is derived from the shape of its outer appearance in which a plurality of prongs each protruding in an axial direction are arranged on an annular base. Further, the crown-shaped retainer belongs to a retainer formed by injection molding, die casting, sintering, or the like, that is, a molded retainer.

A ball bearing is a rolling bearing using balls as the rolling elements. As illustrated in FIG. 2, the ball bearing includes, as main components thereof, an inner race 10 having a raceway 12 formed on an outer circumference thereof, an outer race 14 having a raceway 16 formed on an inner circumference thereof, a plurality of balls 18 interposed between the raceway 12 of the inner race 10 and the raceway 16 of the outer race 14, and a retainer 20 for retaining the balls 18 at predetermined intervals in a circumferential direction. Note that, illustrations of a lubricant, a seal, and other auxiliary components are omitted herein.

The inner race 10 and the outer race 14 each have a ring shape, and the balls 18 interposed between the inner race 10 and the outer race 14 concentric with each other may roll along the raceway 12 of the inner race 10 and the raceway 16 of the outer race 14. Thus, the inner race 10 and the outer race 14 are freely rollable relative to each other. One of the inner race 10 and the outer race 14 is mounted on a stationary side, whereas the other of the inner race 10 and the outer race 14 is mounted on a rotary side. In general, the inner race 10 is mounted on a rotational shaft, whereas the outer race 14 is mounted on a housing.

Various types of ball bearing such as a deep groove ball bearing and an angular contact ball bearing are used for an automotive transmission. In electric vehicles and hybrid vehicles, high-speed motor rotation is input so that the rotary part such as the rotational shaft tends to be rotated at high speed (see paragraph 0006 of Patent Literature 1). As a result, polyamide (PA) such as polyamide 46 (PA 46) or polyamide 66 (PA 66), which is a material of the related-art retainer, cannot withstand deformation caused by a centrifugal force along with the high-speed rotation, and hence polyether ether ketone (PEEK) having high mechanical strength is used to address this issue in actuality (see paragraph 0032 of Patent Literature 1). For example, when the bearing is used for such high-speed rotation that a dmn value {product of dm (mean diameter of ball row (mm)) and n (rotational speed of ball bearing ($min^{-1}$))} is more than 600,000, the use of a highly functional resin having high mechanical strength, such as PEEK, for the production of the retainer material may suppress the retainer deformation caused by the centrifugal force.

CITATION LIST

Patent Literature 1: JP 2003-314561 A
Patent Literature 2: JP 2011-074962 A

SUMMARY OF INVENTION

Technical Problems

PEEK is a highly functional resin, which is suited as a material of a retainer of a bearing to be used under a high-speed rotation environment, such as electric vehicles and hybrid vehicles. Further, annealing is known as a method of further enhancing the function of the PEEK material. The use of annealing may further promote fusion between molecules. However, there is a problem in that an advanced manufacturing technology is required to enhance the function of the PEEK material. That is, annealing is required to maximize the function of the PEEK material, but in a case of a large-diameter bearing to be used for electric vehicles and hybrid vehicles, the retainer itself has a large diameter as well, and is thin relative to the diameter, thereby causing a warp in the retainer. Therefore, annealing and advanced design considering the fluidity of the PEEK material are required for the manufacture of the retainer.

Further, in the crown-shaped retainer made of resin, a pocket inlet diameter a (separation distance between a pair of prongs 26) is set smaller than a ball diameter dw (a<dw) as illustrated in FIG. 3 and FIGS. 4A and 4B. Further, the space between the pair of prongs 26 is elastically expanded by utilizing the elasticity of the resin material, to thereby assemble the balls into pockets 24, respectively. However, when a retainer having the same shape and dimensions as the related-art retainer is to be manufactured from the retainer material having high mechanical strength, such as PEEK, there is a fear in that a crack may be generated in the retainer 20 during the assembling of the balls 18.

Note that, in assembling the balls, the inner race 10, the outer race 14, and the balls 18 are assembled together, and then the prong 26 side of the retainer 20 is moved in the axial direction toward the balls 18. Thus, the balls 18 elastically expand the space between the pair of prongs 26 to enter (snap into) the pockets 24, respectively. As described above, the retainer is moved toward the balls in the actual assembling process, but for convenience of the description herein, this situation is described as "the balls are assembled into the retainer".

It is a primary object of the present invention to provide a crown-shaped retainer for a ball bearing, which is manufacturable without the need to employ an advanced manufacturing technology unlike the case of using a PEEK material but has performance equal to that of a crown-shaped retainer made of the PEEK material, and is capable of achieving assembling of balls without generating any crack.

Solution to Problems

The present invention has solved the problems by changing a material of the crown-shaped retainer from PEEK to materials for die-cast products, forming an inner circumferential surface of each pocket, which has a spherical shape in the related art, from a spherical portion positioned on a radially inner side of the retainer and a cylindrical portion positioned on a radially outer side of the retainer, and by setting an inner diameter of the cylindrical portion larger than a ball diameter.

Specifically, according to one embodiment of the present invention, there is provided a crown-shaped retainer, comprising: an annular base; a plurality of pockets each penetrating the crown-shaped retainer in a radial direction thereof and having an opening on one side of the crown-shaped retainer in an axial direction thereof; and a pair of prongs positioned on both sides of the opening of each of the plurality of pockets in a circumferential direction of the crown-shaped retainer, the each of the plurality of pockets having an inner circumferential surface comprising: a spherical portion positioned on a radially inner side of the crown-shaped retainer; and a cylindrical portion positioned on a radially outer side of the crown-shaped retainer, the cylindrical portion having an inner diameter larger than a ball diameter.

With the structure in which the inner diameter of the cylindrical portion of each pocket that is positioned on the radially outer side of the retainer is set larger than the ball diameter, when the balls are assembled into the pockets, respectively, the retainer is tilted radially inward without being constrained by the balls. Thus, the balls are allowed to enter the pockets from the side where the inner diameters are larger.

Advantageous Effects of Invention

According to the one embodiment of the present invention, when the balls are assembled into the pockets of the crown-shaped retainer, respectively, the space between the pair of prongs is not forcibly increased in diameter, and hence there is no fear of a crack or other damage to the retainer. Thus, the assembling work for the balls is facilitated as well.

As described above, there is no fear of damage to the retainer that may be caused by assembling the balls, thereby being capable of employing a material having mechanical strength equal to or higher than that of PEEK. Therefore, when the retainer material is changed from PEEK to materials for die-cast products, mechanical strength equal to or higher than that of PEEK can be secured. As an alloy for die casting, there maybe employed an alloy arbitrarily selected from among well-known alloys such as a magnesium alloy, an aluminum alloy, and a zinc alloy.

Moreover, when any material for die-cast products is employed, it is possible to manufacture a retainer having an equivalent function without the need to employ the advanced manufacturing technology that is required in the case of using the PEEK material. Further, the productivity is high because the die casting may be employed for manufacturing the retainer, with the result that an effect can be expected also from the viewpoint of cost.

Thus, due to the mechanical strength equal to that of the PEEK material, the crown-shaped retainer according to the one embodiment of the present invention is capable of preventing retainer deformation that may hinder smooth rotation of the bearing even under such high-speed rotation that a dmn value is more than 600,000.

BRIEF DESCRIPTION OF DRAWINGS

FIG. 5 is a table showing a list of properties of respective retainer materials.

DESCRIPTION OF EMBODIMENTS

Now, an embodiment of the present invention is described with reference to the accompanying drawings.

Note that, the same parts or components as those of the related-art crown-shaped retainer that is already described with reference to FIGS. 2, 3, 4A, and 4B are represented by the same reference symbols, and redundant description is therefore omitted herein.

Figure 1A:
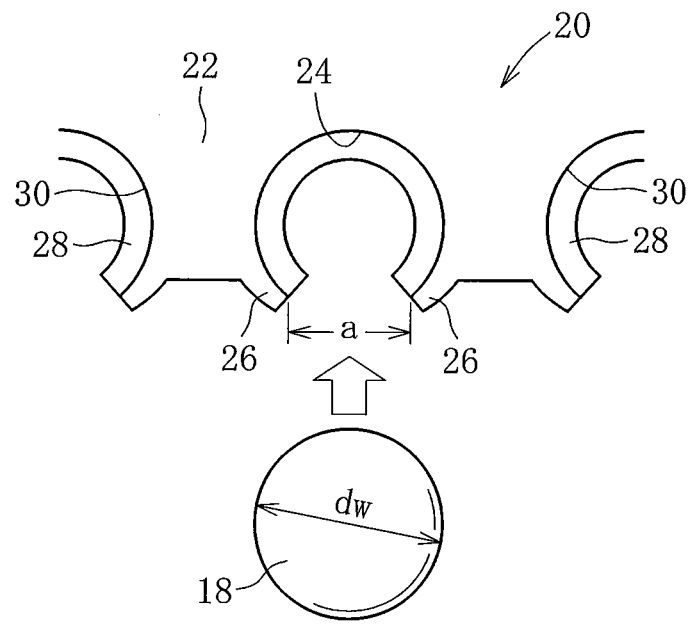
FIG. 1(A) is a partial developed plan view of a retainer according to an example of the present invention.
Figure 1B:
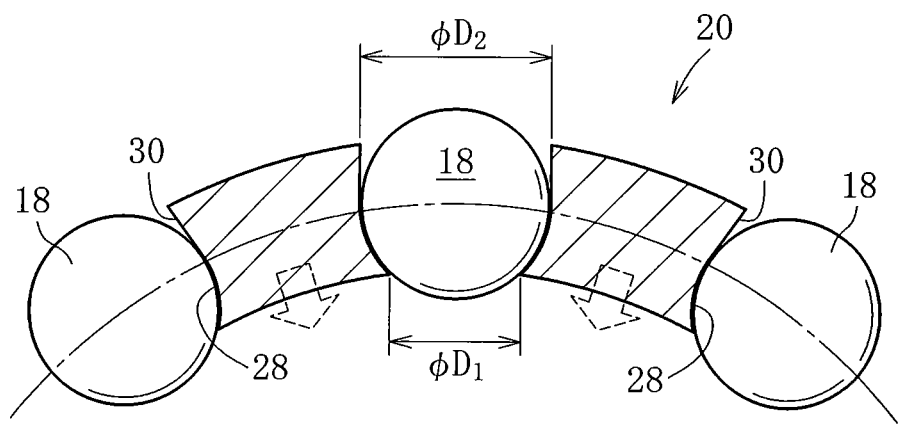
FIG. 1(B) is a partial sectional view of the retainer according to the example of the present invention.
Figure 2:
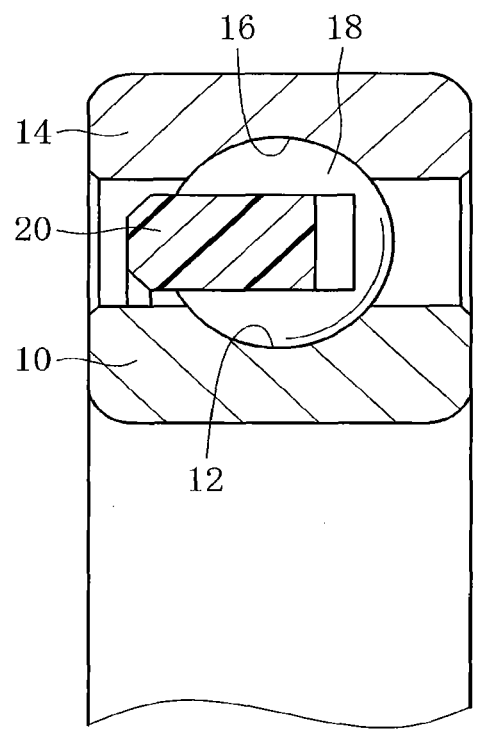
FIG. 2 is a sectional view of a ball bearing.
Figure 3:
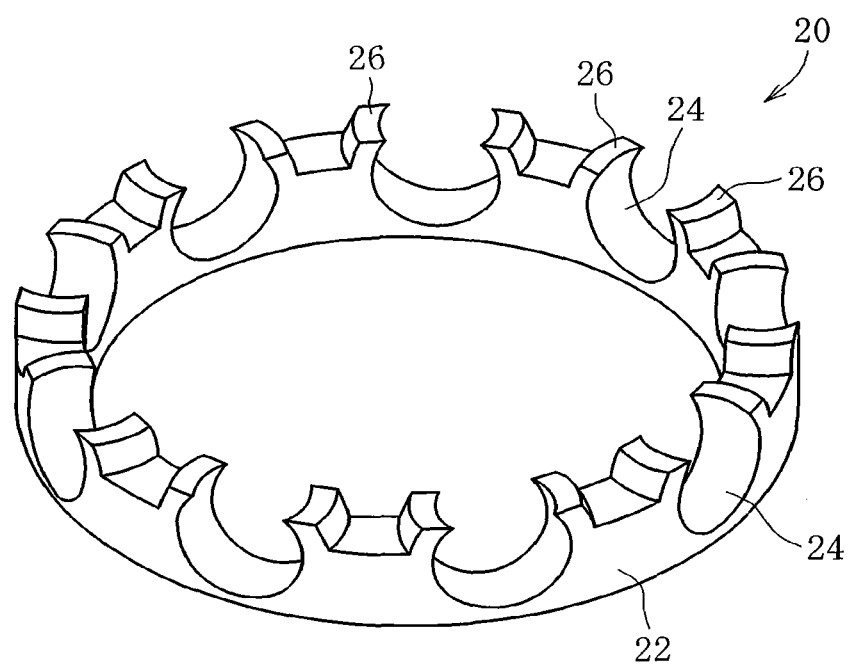
FIG. 3 is a perspective view of a retainer according to the related art.

FIGS. 1A and 1B illustrate an example of a crown-shaped retainer 20. The entire outer appearance of the crown-shaped retainer 20 is similar to that of the related-art crown-shaped retainer illustrated in FIGS. 4A and 4B. The crown-shaped retainer 20 comprises an annular base 22, a plurality of pockets 24, and a pair of prongs 26 each protruding in an axial direction of the retainer from an opening of each pocket 24. Further, as understood from FIG. 1A, the pocket 24 is opened toward one side of the retainer 20 in the axial direction. Note that, FIG. 1A is a partial developed plan view of the retainer 20, and the vertical direction of FIG. 1A corresponds to the axial direction of the retainer. A separation distance between the pair of prongs 26, that is, a pocket inlet diameter a is set smaller than a ball diameter dw (a<dw).

Figure 4A:
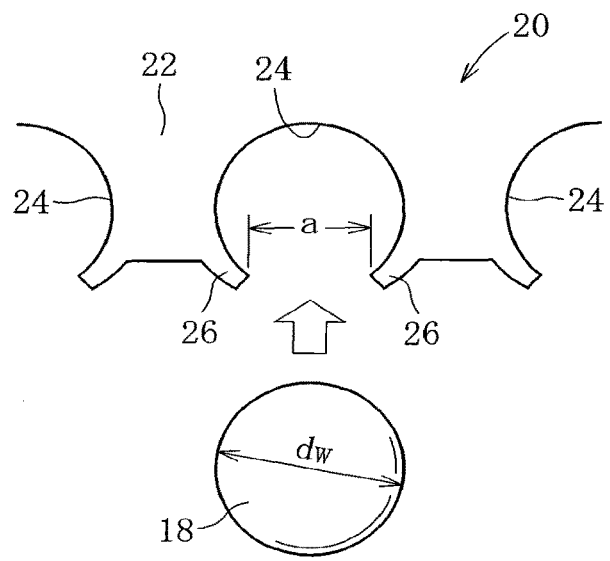
FIG. 4(A) is a partial developed plan view of the retainer of FIG. 3.
Figure 4B:
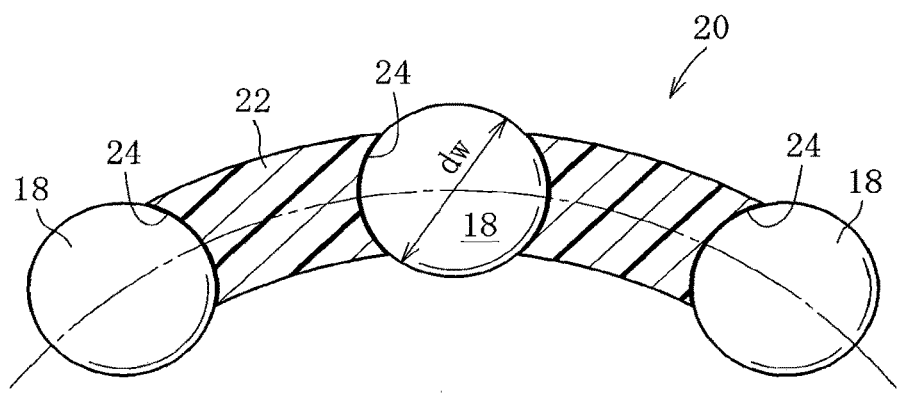
FIG. 4(B) is a partial sectional view of the retainer of FIG. 3.

However, this crown-shaped retainer 20 is different from the crown-shaped retainer of FIGS. 4A and 4B in the shape of an inner circumferential surface of the pocket 24 as described below.

As understood from FIG. 1B illustrating a cross section passing through the center of the pocket 24 of FIG. 1A, the pocket 24 penetrates the retainer 20 in a radial direction. Further, the inner circumferential surface of each pocket 24 comprises a spherical portion 28 positioned on a radially inner side of the retainer, and a cylindrical portion 30 positioned on a radially outer side of the retainer. The spherical portion 28 corresponds to a part of the spherical pocket 24 of the related-art crown-shaped retainer, and has an inner diameter slightly larger than the ball diameter dw. An end of the spherical portion 28 on the radially inner side of the retainer is an opening having an inner diameter $\phi D_1$ smaller than the ball diameter dw.

An inner diameter $\phi D_2$ of the cylindrical portion 30 is slightly larger than the ball diameter dw. Accordingly, with the structure in which the inner diameter $\phi D_2$ of the pocket 24 on the radially outer side of the retainer is set larger than the ball diameter dw, when balls 18 are assembled into the pockets 24, respectively, the retainer 20 is tilted radially inward without being constrained by the balls 18 as indicated by the broken line arrows of FIG. 1B. That is, in the process of assembling the bearing, under a state in which an inner race 10, an outer race 14, and the balls 18 are assembled together, the retainer 20 is moved in the axial direction toward the balls 18 while the openings of the pockets 24 are set in phase with the balls 18. Then, the balls 18 are caused to enter the pockets 24, respectively, from the side where the inner diameters of the pockets 24 are larger ($\phi D_1 < \phi D_2$), but the balls 18 are constrained by the inner race 10 and the outer race 14 in the radial direction, with the result that the retainer 20 is tilted radially inward. Note that, FIG. 1B illustrates a state in which the assembling of the balls 18 is completed, and hence the retainer 20 is already recovered from its tilt (elastic deformation). In this manner, the assembling of the balls 18 is facilitated, thereby being capable of assembling the balls 18 without causing any damage to the retainer 20, such as a crack.

The retainer 20 is manufactured by die casting. As an alloy for die casting, various kinds of non-ferrous alloy are known. For example, as defined in JIS, zinc alloy die casting (JIS H 5301), aluminum alloy die casting (JIS H 5302), and magnesium alloy die casting (JIS H 5303) are employed, and a copper alloy, a lead alloy, a tin alloy, and the like are also employed. As shown in FIG. 5, even when the retainer material is changed from PEEK to materials for die-cast products, mechanical strength equal to or higher than that of PEEK can be secured. Also from the viewpoint of manufacture, the productivity is high because of die casting.

A ball bearing using the above-mentioned crown-shaped retainer is applicable to such a high-speed rotation use that a dmn value is more than 600,000, in which the related-art crown-shaped retainer made of PEEK has been used. As such a use, for example, there may be given a ball bearing for supporting gears of a transmission.

The embodiment of the present invention has been described by way of example illustrated in the drawings, but the present invention maybe carried out through various modifications without departing from the scope of claims.

REFERENCE SIGNS LIST 10 inner race
12 raceway
14 outer race
16 raceway
18 ball
20 retainer
22 annular base
24 pocket
26 prong
28 spherical portion
30 cylindrical portion

The invention claimed is:

1. A crown-shaped retainer, comprising:
an annular base;
a plurality of pockets each penetrating the crown-shaped retainer in a radial direction thereof and having an opening on one side of the crown-shaped retainer in an axial direction thereof; and
a pair of prongs positioned on both sides of the opening of each of the plurality of pockets in a circumferential direction of the crown-shaped retainer, wherein
each of the plurality of pockets has an inner circumferential surface comprising:
a spherical portion positioned on a radially inner side of the crown-shaped retainer; and
a cylindrical portion positioned on a radially outer side of the crown-shaped retainer, and
the cylindrical portion and the spherical portion have inner diameters larger than a ball diameter.

2. The crown-shaped retainer according to claim 1, wherein the crown-shaped retainer comprises a molded retainer, which is formed by die casting.

3. The crown-shaped retainer according to claim 2, wherein a material of the crown-shaped retainer is one selected from the group consisting of a magnesium alloy, an aluminum alloy, and a zinc alloy.

4. The crown-shaped retainer according to claim 3, wherein the crown-shaped retainer is used for a ball bearing having a dmn value of more than 600,000.

5. The crown-shaped retainer according to claim 4, wherein the crown-shaped retainer is used for a ball bearing for a transmission.

6. The crown-shaped retainer according to claim 3, wherein the crown-shaped retainer is used for a ball bearing for a transmission.

7. The crown-shaped retainer according to claim 2, wherein the crown-shaped retainer is used for a ball bearing for a transmission.

8. The crown-shaped retainer according to claim 2, wherein the crown-shaped retainer is used for a ball bearing having a dmn value of more than 600,000.

9. The crown-shaped retainer according to claim 8, wherein the crown-shaped retainer is used for a ball bearing for a transmission.

10. The crown-shaped retainer according to claim 1, wherein the crown-shaped retainer is used for a ball bearing having a dmn value of more than 600,000.

11. The crown-shaped retainer according to claim 10, wherein the crown-shaped retainer is used for a ball bearing for a transmission.

12. The crown-shaped retainer according to claim 1, wherein the crown-shaped retainer is used for a ball bearing for a transmission.

13. A ball bearing comprising:
an inner race having a raceway formed on an outer circumference thereof;
an outer race having a raceway formed on an inner circumference thereof;
a plurality of balls interposed between the raceway of the inner race and the raceway of the outer race; and
a crown-shaped retainer according to claim 1 that retains the balls at predetermined intervals in a circumferential direction.

* * * * *